(12) United States Patent
Kito et al.

(10) Patent No.: US 9,487,083 B2
(45) Date of Patent: Nov. 8, 2016

(54) FUEL SUPPLY APPARATUS

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP); Atsushi Sekihara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 399 days.

(21) Appl. No.: 14/259,700

(22) Filed: Apr. 23, 2014

(65) Prior Publication Data

US 2014/0319161 A1  Oct. 30, 2014

(30) Foreign Application Priority Data

Apr. 26, 2013 (JP) ................................. 2013-093531

(51) Int. Cl.
  *B65B 1/04* (2006.01)
  *B60K 15/04* (2006.01)
  *B60K 15/035* (2006.01)

(52) U.S. Cl.
  CPC ..... *B60K 15/04* (2013.01); *B60K 2015/03538* (2013.01); *B60K 2015/047* (2013.01); *B60K 2015/0461* (2013.01)

(58) Field of Classification Search
  CPC ............ B60K 15/04; B60K 2015/047; B60K 2015/0461
  See application file for complete search history.

(56) References Cited

U.S. PATENT DOCUMENTS

| | | | |
|---|---|---|---|
| 6,681,817 B2 | 1/2004 | Hagano et al. | |
| 2002/0092581 A1 | 7/2002 | Hagano et al. | |
| 2003/0075221 A1* | 4/2003 | Beaulne | B60K 15/04 |
| | | | 137/587 |

FOREIGN PATENT DOCUMENTS

| | | |
|---|---|---|
| JP | S60-062327 U1 | 5/1985 |
| JP | H04-108035 A | 4/1992 |
| JP | H11-321350 A | 11/1999 |
| JP | 2001-088858 A | 4/2001 |

OTHER PUBLICATIONS

Office Action issued Mar. 8, 2016 in the corresponding JP application No. 2013-093531 (with English translation).

* cited by examiner

*Primary Examiner* — Jason K Niesz
(74) *Attorney, Agent, or Firm* — Posz Law Group, PLC

(57) ABSTRACT

A fuel supply apparatus for supplying fuel to a fuel tank includes a passage forming member that has a fuel passage connected to the fuel tank, an injection port forming member that is disposed in the fuel passage and fixed to the passage forming member, the injection port forming member having an injection port forming a part of the fuel passage, and an injection port open and close mechanism that is mounted to the injection port forming member and has an open and close member for opening and closing the injection port. A reinforcing member of the passage forming member and a welded portion of the passage forming member and the injection port forming member are arranged in the vicinity of a common plane perpendicular to a center line of the fuel passage.

17 Claims, 12 Drawing Sheets

FUEL SUPPLY APPARATUS

CROSS-REFERENCE TO RELATED APPLICATIONS

This application claims the benefit of Japanese Patent Application No. 2013-093531 (filed on Apr. 26, 2013), the entire contents of which are hereby incorporated by reference.

BACKGROUND

1. Technical Field

The present invention relates to a fuel supply apparatus including a fuel passage for guiding fuel to a fuel tank.

2. Related Art

Conventionally, a configuration in which a filler neck made of a resin is used is known as a fuel supply apparatus used in automobiles (see Patent Document 1). The filler neck has a pipe body made of a resin, a cap for opening and closing an opening of the pipe body, an inner member mounted in the pipe body, and a flap valve for opening and closing an injection port provided on the inner member. An outer perimeter of the inner member is welded and fixed to the pipe body, thereby sealing between the inner member and the pipe body is sealed.

[Patent Document 1] JP-A-2001-088858

However, because a region where the pipe body and the inner member are welded to each other is weak in impact from the outside due to collision of a vehicle or the like, there is a possibility that a deformation is caused around such a welded region to impair a sealing ability.

Accordingly, the present invention is directed to solve at least parts of the above problems, and can be embodied as the following aspects or applications.

SUMMARY (1) According to an aspect of the invention, a fuel supply apparatus for supplying fuel to a fuel tank includes a passage forming member that has a fuel passage connected to the fuel tank, an injection port forming member that is disposed in the fuel passage and fixed to the passage forming member, the injection port forming member having an injection port forming a part of the fuel passage, and an injection port open and close mechanism that is openably and closably mounted to the injection port forming member and has an open and close member for opening and closing the injection port. The passage forming member and the injection port forming member are formed of resin materials welded to each other and the passage forming member and the injection port forming member are welded at a welded portion along an entire perimeter thereof to seal a gap between the passage forming member and the injection port forming member. The passage forming member has a reinforcing member arranged in an annular shape along the entire perimeter of the passage forming member. The reinforcing member is formed of a material having a mechanical strength higher than the passage forming member. The reinforcing member and the welded portion are arranged in the vicinity of a common plane perpendicular to a center line of the fuel passage.

According to the aspect (1), the passage forming member has the reinforcing member arranged in an annular shape along the entire circumference thereof. The reinforcing member and the welded portion are arranged on the common plane perpendicular to the center line of the fuel passage. In addition, the reinforcing member is formed of a material having a mechanical strength higher than the passage forming member. Therefore, even if a vehicle collides or the like and thus an external force due to collision of the vehicle or the like is exerted on the vicinity of the welded portion of the passage forming member, the reinforcing member can mitigate an impact on the vicinity of the welded portion or the injection port forming member, thereby protecting a sealed region. Thus, during collision of the vehicle, a fuel in the fuel tank can be prevented from being discharged to the outside.

(2) In the fuel supply apparatus of (1), the reinforcing member is formed of a metallic material.

(3) In the fuel supply apparatus of (2) or (3), the passage forming member has a flange portion formed on an opened end of the passage forming member by enlarging a diameter of the end of the passage forming member toward an outer perimeter thereof, and the reinforcing member is mounted on the flange portion and arranged at a location spaced from the welded portion toward the outer perimeter.

(4) In the fuel supply apparatus of (3), the passage forming member has an inner resin layer having a pipe shape for forming the fuel passage and formed of a first resin material, and an outer resin layer stacked on an outer surface of the inner resin layer and formed of a second resin material. The first resin material and the second resin material is configured so that one layer is formed of a resin material having a fuel permeation-resistance better than that of the other layer. The flange portion is formed on an end of either the inner resin layer or the outer resin layer.

(5) In the fuel supply apparatus of 1 or 2, the passage forming member has a supporting portion formed on an opened end of the passage forming member and protruding from an end of the passage forming member toward an inner perimeter thereof, and the reinforcing member is mounted to the supporting portion.

(6) The fuel supply apparatus of any one of (1) to (5) further includes a cover member mounted to an upper part of the passage forming member to cover the injection port open and close mechanism. The cover member has a cup shape surrounded by a side wall portion and a top wall extending from a perimeter edge of the side wall portion, and has an engaging claw formed on the side wall portion. The engaging claw is engaged with the flange portion and thus the cover member is mounted to the passage forming member.

(7) In the fuel supply apparatus of (1), the reinforcing member is provided to be located more toward an inner perimeter than the welded portion and to be adjacent to the welded portion.

(8) According to another aspect of the invention, a fuel supply apparatus for supplying fuel to a fuel tank includes a passage forming member that has a fuel passage connected to the fuel tank, an injection port forming member that is disposed in the fuel passage and fixed to the passage forming member, the injection port forming member having an injection port constituting a part of the fuel passage, and an injection port open and close mechanism that is openably and closably mounted to the injection port forming member and has an open and close member for opening and closing the injection port. The passage forming member and the injection port forming member are formed of resin materials welded to each other and the passage forming member and the injection port forming member are welded at a welded portion along an entire circumference thereof to seal a gap between the passage forming member and the injection port forming member. The passage forming member has an external force absorption portion arranged in an annular shape along the entire circumference of the passage forming member, and the external force absorption portion is located more toward an outer perimeter than a region provided with the welded portion and is arranged with a gap. The external force absorption portion is configured to be elastically deformed in a direction, in which the gap is narrowed, when an external force F is exerted thereon. The gap and the welded portion are arranged on a common plane perpendicular to a center line of the fuel passage.

According to the aspect (8), the gap is formed between an end surface on an inner perimeter side of the flange portion and an end of the injection port forming member. If an external force is exerted on the flange portion, an extension portion is bended to reduce the gap, and thus an influence of the external force on the welded portion can be mitigated.

(9) In the fuel supply apparatus of (8), the passage forming member has a flange portion formed on an opened end of the passage forming member by enlarging a diameter of the end of the passage forming member toward an outer perimeter thereof, and the external force absorption portion is formed on the flange portion.

(10) In the fuel supply apparatus of (9), the passage forming member has an inner resin layer having a pipe shape for forming the fuel passage and formed of a first resin material, and an outer resin layer stacked on an outer surface of the inner resin layer and formed of a second resin material. The first resin material and the second resin material is configured so that one layer is formed of a resin material having a fuel permeation-resistance better than that of the other layer. The flange portion is formed on an end of either the inner resin layer or the outer resin layer.

(11) The fuel supply apparatus of (9) or (10), further includes a cover member mounted to an upper part of the passage forming member to cover the injection port open and close mechanism. The cover member has a cup shape surrounded by a side wall portion and a top wall, and has an engaging claw formed on the side wall portion. The engaging claw is engaged with the flange portion and thus the cover member is mounted to the passage forming member.

DETAILED DESCRIPTION

A. First Embodiment (1) General Configuration of Fuel Supply Apparatus

Figure 1:
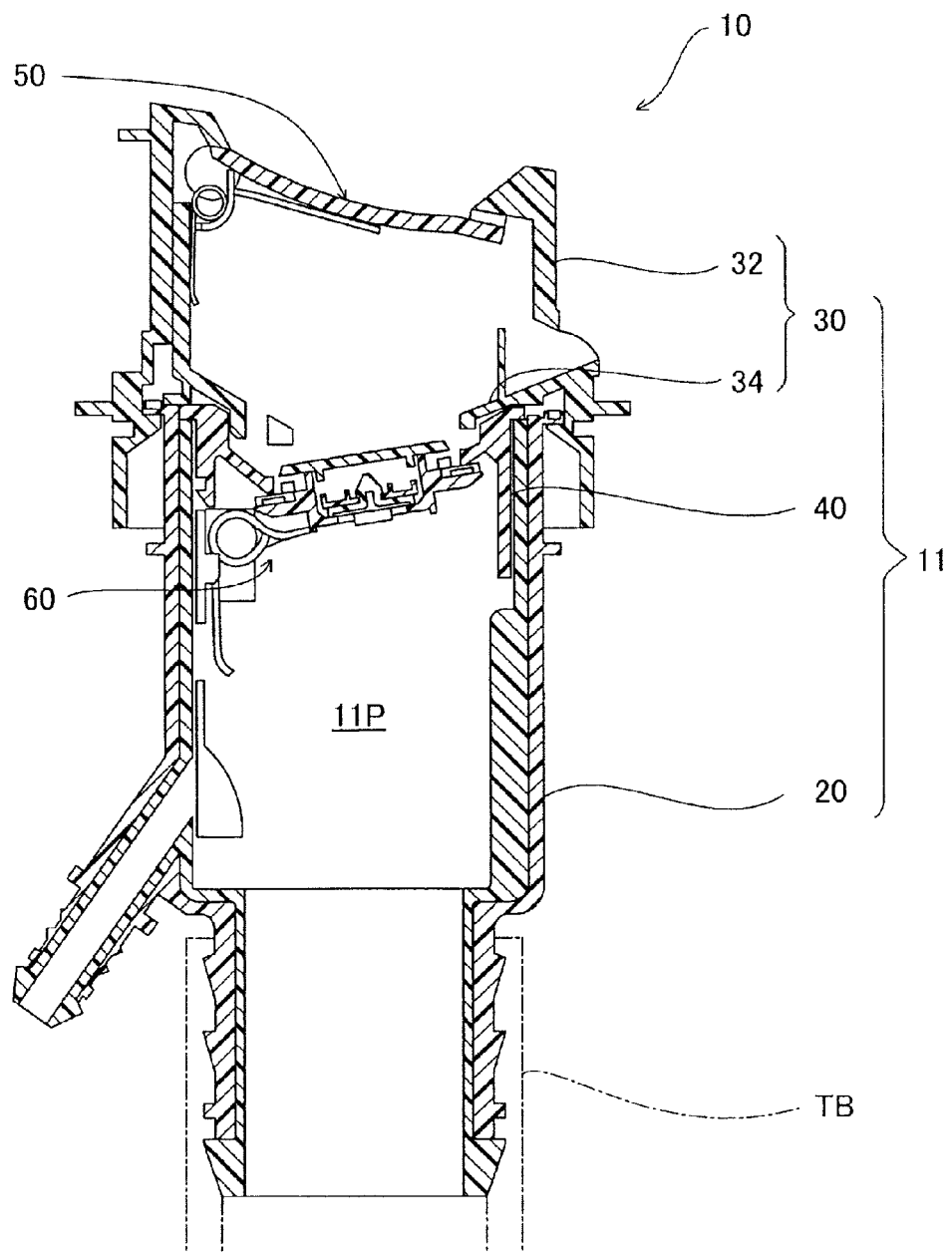
FIG. 1 is a sectional view showing a fuel supply apparatus using a filler neck according to a first embodiment of the present invention.

FIG. 1 is a sectional view showing a fuel supply apparatus 10 using a filler neck according to a first embodiment of the present invention. In FIG. 1, the fuel supply apparatus 10 includes a tank opening forming member 11 having a fuel passage 11P connected to a fuel tank (not shown), an insertion-side open and close mechanism 50, and an injection port open and close mechanism 60. The fuel supply apparatus 10 is configured so that, when the insertion-side open and close mechanism 50 and the injection port open and close mechanism 60 is pressed and opened by a fuel supply nozzle and then fuel is injected from the fuel supply nozzle to the fuel passage 11P, the fuel is supplied to the fuel tank through the fuel passage 11P. In the following, configuration of each part will be described.

(2)-1 Configuration of Tank Opening Forming Member 11

The tank opening forming member 11 is a tubular body forming the fuel passage 11P and has a passage forming member 20, an insertion passage forming member 30, and an injection port forming member 40.

Figure 2:
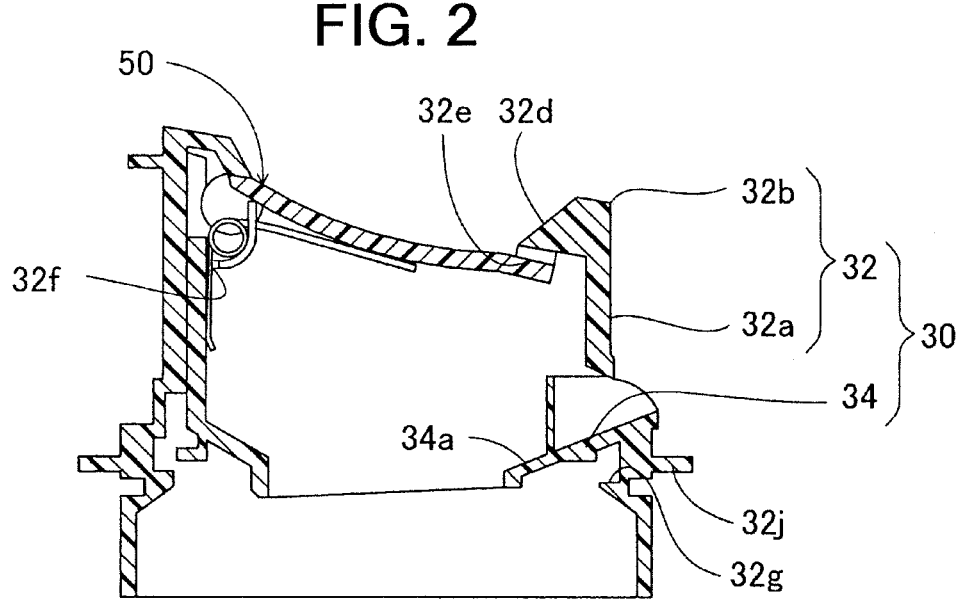
FIG. 2 is a sectional view showing the fuel supply apparatus whose parts have been exploded.
Figure 2:
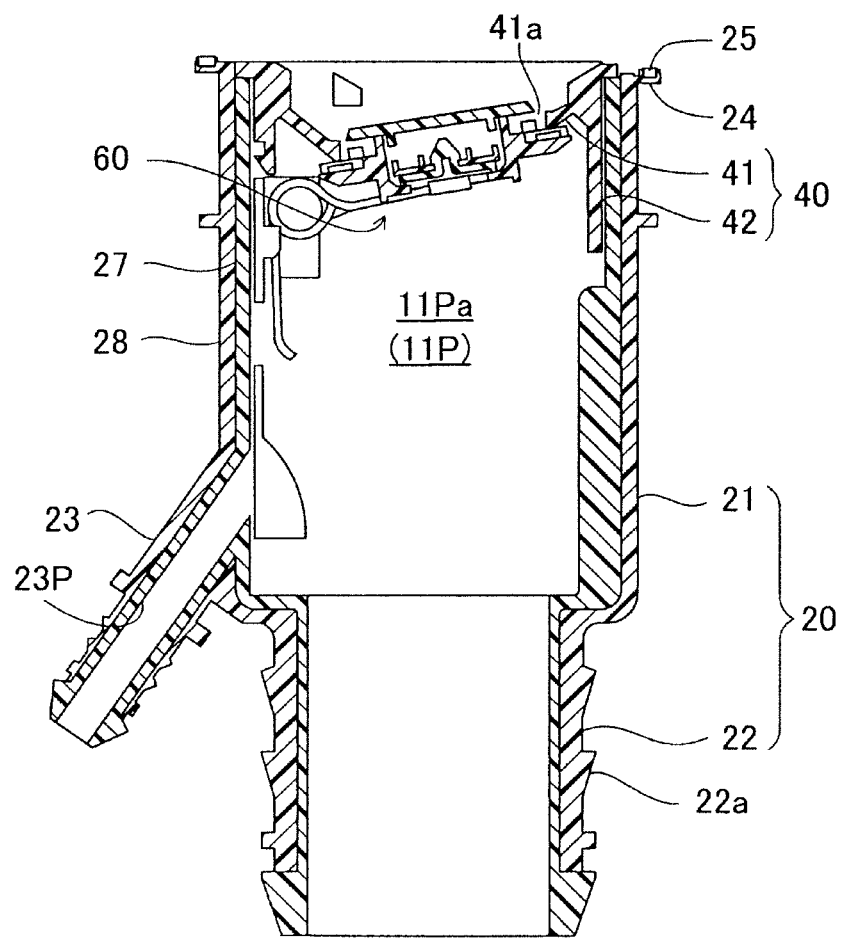

FIG. 2 is a sectional view showing the fuel supply apparatus whose parts have been exploded. The passage forming member 20 is formed by stacking two types of resin materials and has a cylindrical shaped neck body 21, a neck connection portion 22, and a breather tube 23. The neck connection portion 22, which is integrally formed by enlarging a diameter of a lower part of the neck body 21, is a cylindrical body constituting a part of the fuel passage 11P and has an annular protrusion 22a on an outer perimeter thereof. A tube TB (see FIG. 1) is inserted into the neck connection portion 22, and thus, the tube TB is connected to the neck connection 22 by the annular protrusion 22a in a separation-prevented state. The breather tube 23 is a tubular body branched from a side wall of the neck body 21 and an inner side thereof defines a breather passage 23P. The breather passage 23P is connected to the fuel tank, so that fuel vapor inside the fuel tank during supplying fuel is diverted to the neck body 21, thereby allowing a smooth fuel supplying.

The passage forming member 20 is constituted by stacking two types of resin materials and has an inner resin layer 27 located toward the fuel passage 11P and an outer resin layer 28 stacked on an outer surface of the inner resin layer 27. The inner resin layer 27 is formed of a resin material having a good fuel permeation-resistance, for example, polyamide (PA) such as nylon, ethylene vinyl alcohol copolymer (EVOH) or the like, and mainly acts as a barrier layer for inhibiting permeation of fuel. The outer resin layer 28 is formed of a resin material having a good mechanical strength, for example, polyethylene (PE) or the like, and mainly acts as a layer for ensuring mechanical strength and impact resistance of the passage forming member 20. If polyethylene is used as the outer resin layer 28, a resin material (modified polyethylene) modified by maleic acid as a polar functional group may be used. The modified polyethylene is bonded with PA by chemical adhesion, and thus adhered to the inner resin layer 27.

The insertion passage forming member 30 has a cover member 32. The cover member 32 is mounted on an upper part of the passage forming member 20 and has a cylindrical side wall portion 32a and a top wall 32b. The side wall portion 32 has an inclined upper part, to which the top wall 32b is integrally formed. The top wall 32b has an opening portion 32d for inserting a fuel supply nozzle. The opening portion 32d has an insertion opening 32e and a shaft supporting portion 32f. The insertion opening 32e has a generally circular shape to allow insertion of the fuel supply nozzle and constitutes a part of the fuel passage 11P. The shaft supporting portion 32f, which is formed on an inner wall of the side wall portion 32a, is a portion for mounting and supporting an end of the insertion-side open and close mechanism 50.

A passage forming member 34 is formed inside the cover member 32. The passage forming member 34 is a member for defining an insertion passage 11Pa, which is a part of the fuel passage 11P, to insert and guide the fuel supply nozzle, and has an inclined wall 34a. The inclined wall 34a has a conical shape in which a passage area thereof is narrowed toward the fuel tank.

The injection port forming member 40 is a member for supporting the injection port open and close mechanism 60 and has an opening portion 41 and a cylindrical supporting member 42 protruding from a lower surface of an outer perimeter of the opening portion 41 and received in the neck body 21. The opening portion 41 has an injection port 41a. The injection port 41a is a generally circular passage for inserting the fuel supply nozzle and constitutes a part of the fuel passage 11P.

(2)-2 Insertion-Side Open and Close Mechanism 50

Figure 3:
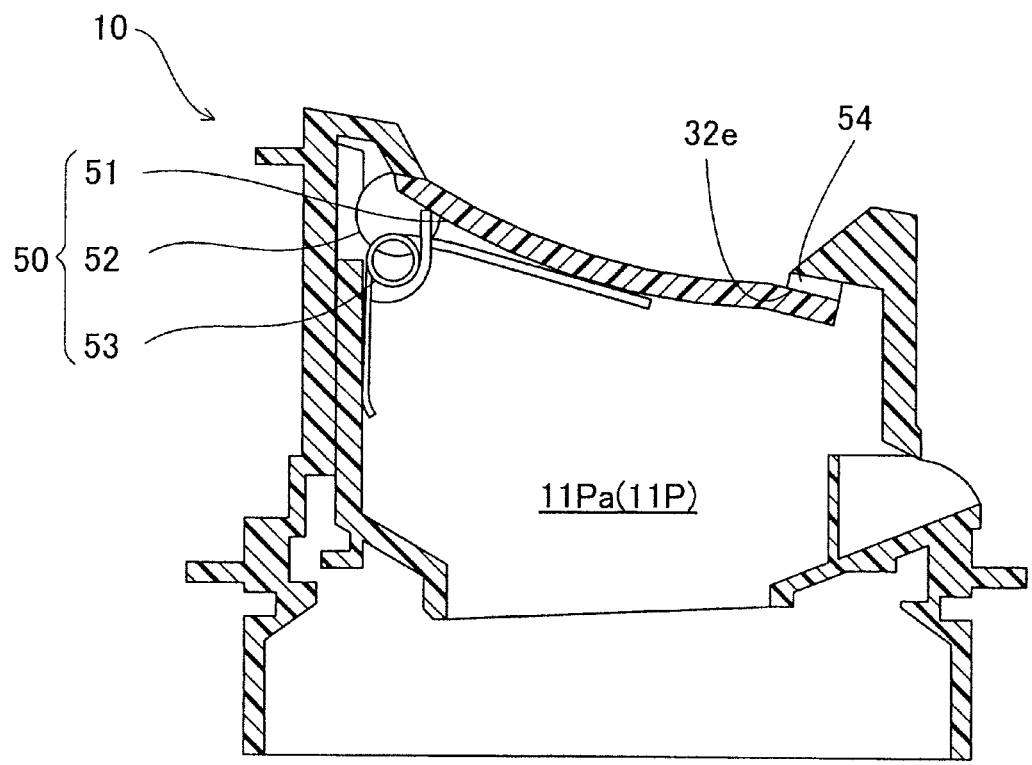
FIG. 3 is an enlarged sectional view showing an upper part of the fuel supply apparatus whose parts have been exploded.
Figure 3:
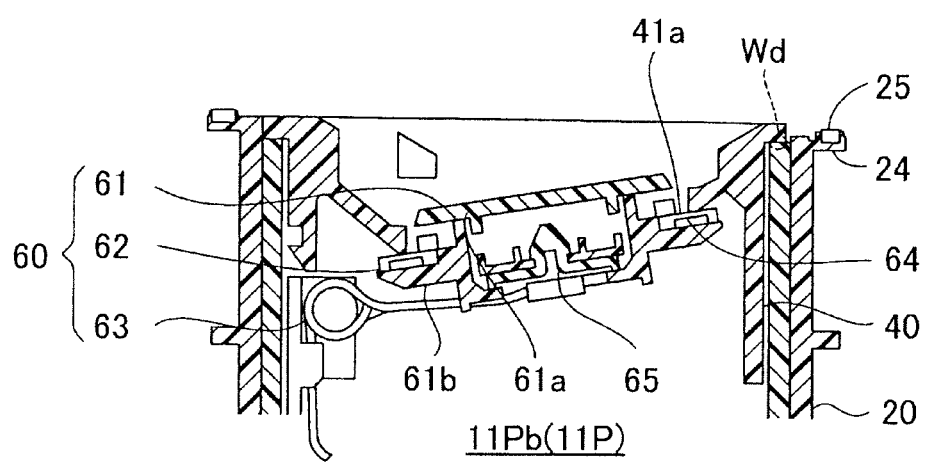

FIG. 3 is an enlarged sectional view showing an upper part of the fuel supply apparatus 10 whose parts have been exploded. The insertion-side open and close mechanism 50 has an open and close member 51, a bearing portion 52, and a spring 53 for urging the open and close member 51 toward a closing direction. The open and close member 51 is pushed by a distal end of the fuel supply nozzle and thus pivoted about the bearing portion 52, thereby opening the insertion opening 32e. A seal member 54 is disposed on an opening perimeter edge of the insertion opening 32e. The open and close member 51 closes the insertion opening 32e in a sealed state by pressing the seal member 54.

(2)-3 Injection Port Open and Close Mechanism 60

The injection port open and close mechanism 60 has an open and close member 61, a bearing portion 62 interposed between the open and close member 61 and the injection port forming member 40 for pivotally supporting the open and close member 61 to the injection port forming member 40, a spring 63 for urging the open and close member 61 toward a closing direction, a gasket 64, and a pressure regulating valve 65. The open and close member 61 has a pressing member 61a and a valve chamber forming member 61b and forms a valve chamber for receiving the pressure regulating member 65. The gasket 64, which is formed in an annular shape by a rubber material, is mounted on an outer perimeter portion of the open and close member 61 and is held between the outer perimeter portion and a perimeter edge of the injection port 41a, thereby closing the injection port 41 in a sealed state. The pressure regulating valve 65, which is received in the valve chamber, has a positive pressure valve urged by a spring and is a valve which, when a pressure of the fuel tank exceeds a predetermined pressure, is opened to relieve the pressure on the fuel tank side.

(2)-4 Mounting Structure for Each Member

Figure 4:
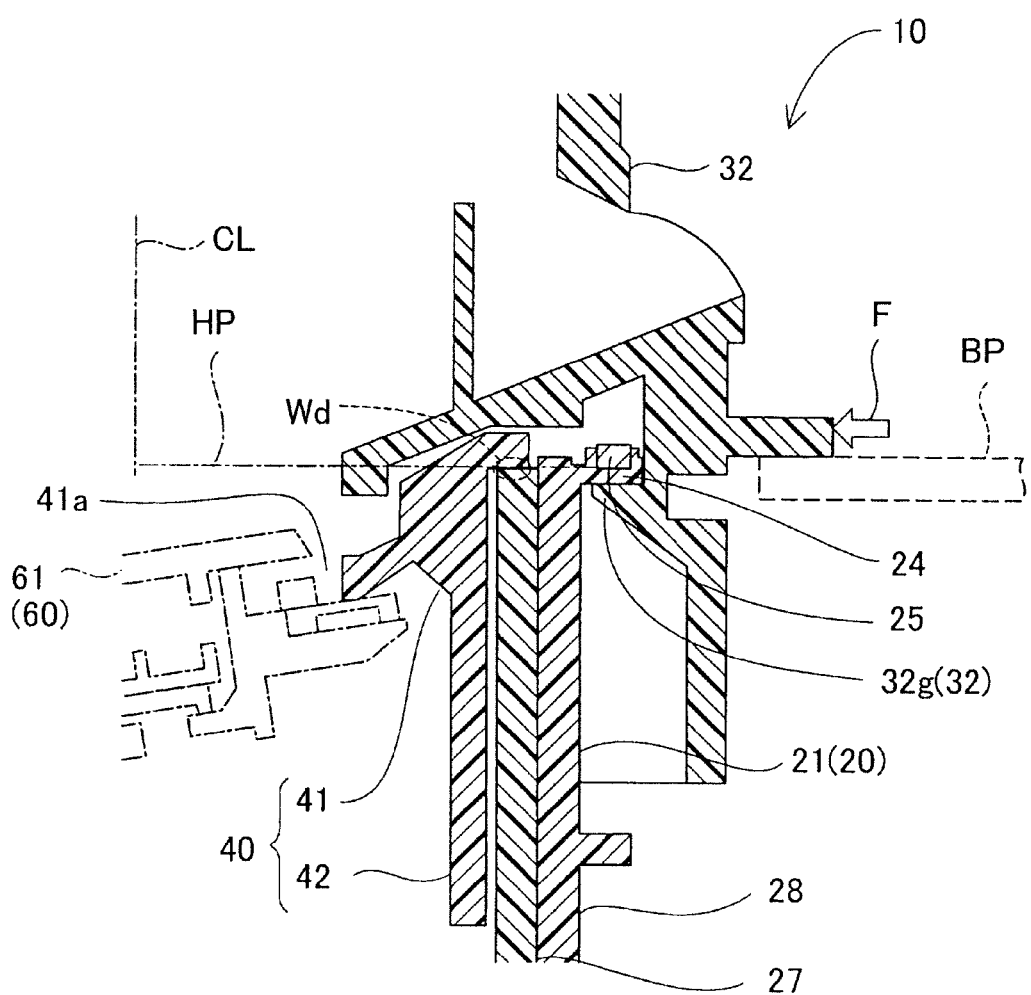
FIG. 4 is an enlarged sectional view showing a main part of the fuel supply apparatus according to FIG. 1.
Figure 5:
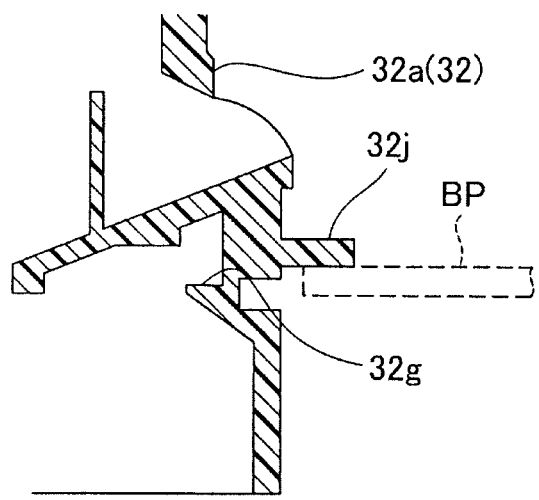
FIG. 5 is a sectional view showing a state where a cover member in FIG. 4 has been removed from a passage forming member.
Figure 5:
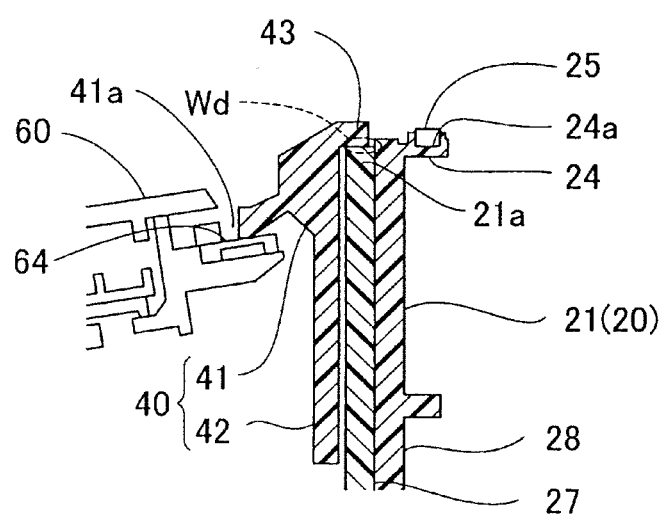

FIG. 4 is an enlarged sectional view showing a main part of the fuel supply apparatus 10 according to FIG. 1, and FIG. 5 is a sectional view showing a state where the cover member 32 in FIG. 4 has been removed from the passage forming member 20. In FIG. 5, a flange portion 24 is formed on the upper part of the passage forming member 20. A retaining recessed portion 24a is formed in an upper surface of the flange portion 24 over the entire perimeter thereof. A reinforcing member 25 is fixed to the retaining recessed portion 24a using insert molding or the like. The reinforcing member 25 is an annular member formed of a metallic material, such as stainless steel.

An engaging claw 32g is formed on a lower part of the side wall portion 32a of the cover member 32. The engaging claw 32g is engaged with the flange portion 24, thereby mounting the cover member 32 to the passage forming member 20. A flange-shaped attaching portion 32j is formed on an outer perimeter portion of the cover member 32. The attaching portion 32j is fixed to a vehicle body-side substrate BP by a fastening member, such as a bolt.

A flange portion 43 is formed on an upper part of the injection port forming member 40. A lower surface of the flange portion 43 is welded on a welding end 21a of the inner resin layer 27. A welded portion Wd is formed using a laser welding method as a welding method. In FIG. 4, the welded portion Wd and the reinforcing member 25 are arranged on a common plane perpendicular to a center line CL of the fuel passage. Herein, the common plane HP is not limited to a plane, which fully includes the welded portion Wd and the reinforcing member 25, but may be slightly deviated in a direction of the center axis, in other words means a region including the vicinity of the common plane.

(3) Method of Manufacturing the Fuel Supply Apparatus 10

To manufacture the fuel supply apparatus 10, the passage forming member 20 and the insertion passage forming member 30 are first manufactured by injection molding. The passage forming member 20 is manufactured by performing two-color injection molding using two types of resin materials. Modified polyethylene for forming the outer resin layer 28 is injected as an initial resin material, and then polyamide for forming the inner resin layer 27 is injected. The modified polyethylene is a resin material in which a polar function group, for example, a functional group modified by maleic acid is added to polyethylene (PE), and is reactively adhered to the polyamide (PA) by a heat during injection molding. Therefore, the inner resin layer 27 and the outer resin layer 28 are welded and integrated with each other by a reactive adhesion using two-color molding. Meanwhile, the insertion passage forming member 30 and the injection port forming member 40 are injection molded using polyethylene and polyamide, respectively.

Then, a laser welding process for integrating the injection port forming member 40 to the passage forming member 20 is performed. The passage forming member 20 is fixed to a supporting table (not shown) and then the injection port forming member 40 is inserted into the passage forming member 20. At this time, the flange portion 43 of the injection port forming member 40 is aligned together with the welding end 21a of the passage forming member 20 and the injection port forming member 40 and the passage forming member 20 are fixed to the supporting table or the like. Meanwhile, the outer resin layer 28 may contain carbon black of 0.1 to 2.0 parts by weight to enhance absorption of laser light.

Next, a laser irradiation apparatus is oriented to the flange portion 43 and the welding end 21a of the neck body 21 and irradiates laser light to a bonding region between the flange portion 43 and the welding end 21a while rotating the supporting table, on which the passage forming member 20 is supported. The welding end 21a contains carbon black of 0.1 to 2.0 parts by weight and thus is melted by absorbing the laser light and also causes an inner surface of the flange portion 43 to be melted. Resin materials of such melted parts are the same resin material (PA) and therefore are compatible to each other and also welded to each other by cooling and solidifying.

The insertion passage forming member 30 is mounted to the cover member 32 and the injection port forming member 40 is mounted to the injection port open and close mechanism 60. Then, the engaging claw 32g of the cover member 32 is engaged with the flange portion 24 to mount the cover member 32, to which the insertion-side open and close mechanism 50 is mounted, to the passage forming member 20. As a result, the fuel supply apparatus 10 as shown in FIG. 1 is obtained.

(4) Actions and Effects of the Foregoing Embodiment

In addition to the effects as described above, the configurations of the foregoing embodiment can obtain the following effects.

(4)-1 As shown in FIG. 4, the injection port open and close mechanism 60 is mounted in the passage forming member 20 with interposing the injection port forming member 40 therebetween. The injection port 41a of the injection port forming member 40 is opened and closed by the open and close member 61. Because the injection port forming member 40 is welded at the welded portion Wd to the passage forming member 20 over the entire perimeter thereof to seal therebetween, a higher sealing ability can be achieved without using a seal member, such an O-ring.

(4)-2 The passage forming member 20 has the reinforcing member 25 arranged in an annular shape along the entire perimeter thereof. The reinforcing member 25 and the welded portion Wd are arranged on the common plane HP perpendicular to the center line CL of the fuel passage 11P. In addition, the reinforcing member 25 is formed of a material having a mechanical strength higher than the passage forming member 20. Therefore, even if a vehicle collides or the like and thus an external force F due to collision of the vehicle or the like is exerted on the vicinity of the welded portion Wd of the passage forming member 20, the reinforcing member 25 can mitigate an impact on the vicinity of the welded portion Wd or the injection port forming member 40, thereby protecting a sealed region. Thus, during collision of the vehicle, a fuel in the fuel tank can be prevented from being discharged to the outside.

(4)-3 The reinforcing member 25 is mounted on the flange portion 24 formed on an opened end of the passage forming member 20 by enlarging a diameter of the end of the passage forming member 20 toward the outer perimeter. Although an impact due to collision of the vehicle or the like the flange portion 24 is likely to be first exerted on the flange portion 24, an impact on the welded portion Wd can be mitigated because the reinforcing member 25 is disposed in such a region.

(4)-4 The passage forming member 20 is formed of two types of different resin materials, namely, the inner resin layer 27 is formed of polyamide having a good fuel permeation-resistance and the outer resin layer 28 is formed of polyethylene having good mechanical strength and impact resistance. The outer resin layer 28 can firmly hold the reinforcing member 25 utilizing the characteristics thereof in mechanical strength.

(4)-5 As shown in FIGS. 2 and 4, the cover member 32 is mounted to the upper part of the passage forming member 20 to cover the injection port open and close mechanism 60. The cover member 32 is mounted to the passage forming member by engaging the engaging claw 32g of the cover member 32 with the flange portion 24. Therefore, even if an external force is exerted on the cover member 32 during collision of the vehicle or the like, the cover member 32 is separated from the passage forming member 20 to absorb impact energy, and therefore the injection port open and close mechanism 60 and the injection port forming member 40 are hardly damaged. In addition, because the flange portion 24 is increased in mechanical strength by the reinforcing member 25, an impact exerted on the welded portion Wd from the cover member 32 can be reduced.

Figure 6:
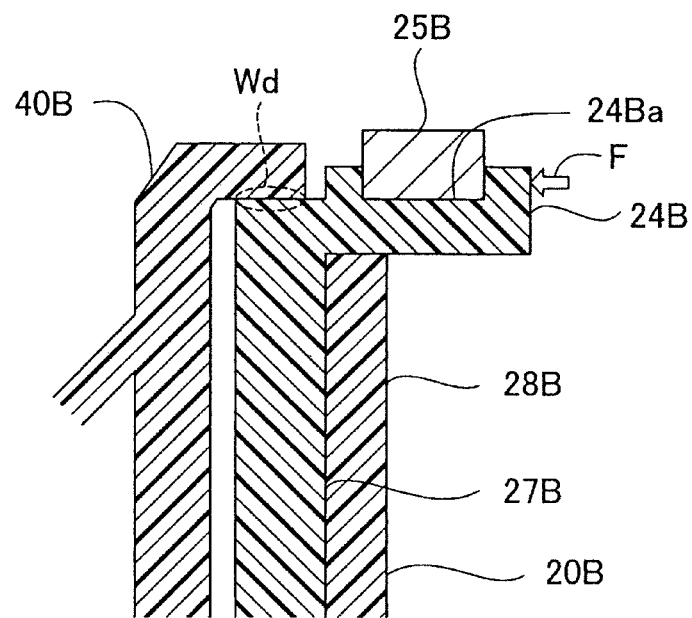
FIG. 6 is a sectional view showing main parts of a passage forming member and an injection port forming member according to a variant of the first embodiment.

B. Variants of First Embodiment (1) FIG. 6 is a sectional view showing a main part of a passage forming member 20B according to a variant of the first embodiment. The present variant is characterized in a shape of the passage forming member 20B and arrangement of a reinforcing member 25B. The passage forming member 20B is constituted by stacking an inner resin layer 27B and an outer resin layer 28B. A flange portion 24B is formed on an upper end of the inner resin layer 27B. The reinforcing member 25B is mounted to the flange portion 24B. On the upper end of the inner resin layer 27b, a flange portion 43B of an injection port forming member 40B is welded at a welded portion Wd. The reinforcing member 25B is arranged to be aligned on a common plane of the welded portion Wd perpendicular to a center line of the fuel passage 11P. Because the flange portion 24B is integrally formed with the inner resin layer 27B formed of polyamide, it is possible to firmly mount the reinforcing member 25B to the inner resin layer 27B utilizing a good thermal adhesion of the inner resin layer 27 to a metallic material.

Figure 7:
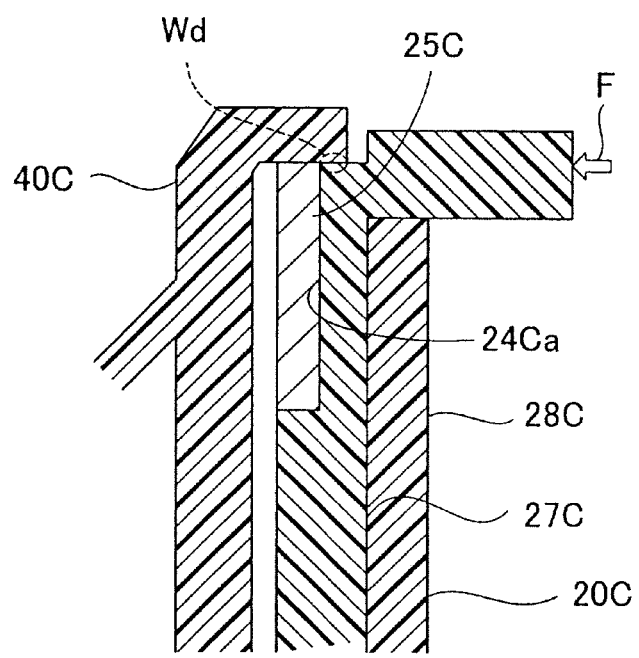
FIG. 7 is a sectional view showing main parts of a passage forming member and an injection port forming member according to another variant.

(2) FIG. 7 is a sectional view showing main parts of a passage forming member 20C and an injection port forming member 40C according to another variant. The present variant is characterized in a shape of the passage forming member 20C and arrangement of a reinforcing member 25C. A recessed portion 24Ca is formed in an inner wall of an upper part of an inner resin layer 27C. In the recessed portion 23Ca, the cylindrical reinforcing member 25C elongated in an upward and downward direction in the figure is mounted. The reinforcing member 25C is arranged to be more adjacent to an inner perimeter side of the passage forming member 20C relative to a welded portion Wd. According to this configuration, the reinforcing member 25C can also enhance a function of protecting an injection open and close mechanism (see FIG. 3) from an external force, in addition to a function of preventing occurrences of problems, such as a breakage of the vicinity of the welded portion Wd due to an external force F.

Figure 8:
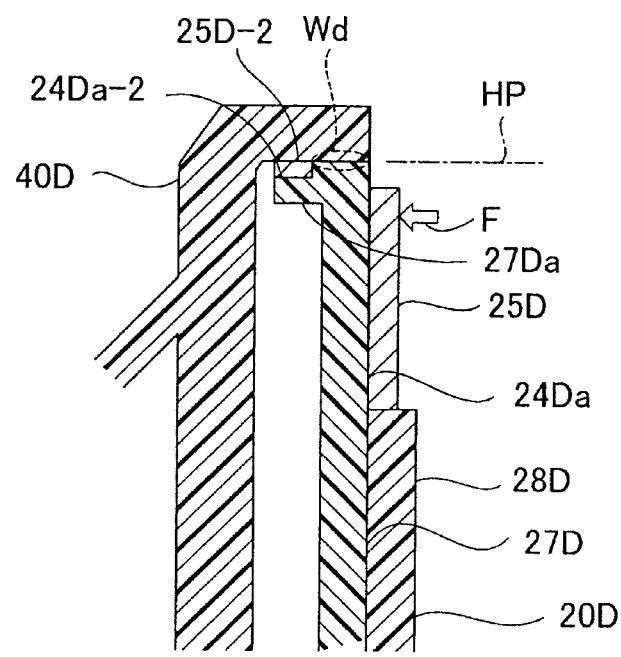
FIG. 8 is a sectional view showing main parts of a passage forming member and an injection port forming member according to a variant in which a part of a configuration of the variant of FIG. 7 are modified.

(3) FIG. 8 is a sectional view showing main parts of a passage forming member 20D and an injection port forming member 40D according to a variant in which parts of the variant of FIG. 7 are modified. The present variant is characterized in a shape of the passage forming member 20D and arrangement of reinforcing members 25D and 24D-2. On an upper part of an inner resin layer 27D, a supporting portion 27Da protruding to an inner perimeter side thereof is formed. An upper surface of the supporting portion 27Da is welded to an upper part of the injection port forming member 40D at a welded portion Wd. A retaining recessed portion 24Da is defined by an outer wall of the upper part of the inner resin layer 27D and an upper end of the outer resin layer 28D. The cylindrical reinforcing member 25D elongated in an upward and downward direction is mounted in the retaining recessed portion 24Da. Also, the reinforcing member 25D-2 is mounted in a retaining recessed portion 24Da-2 of an upper part of the supporting portion 27Da. The reinforcing member 25D-2 is also an annular metallic body.

The upper end of the reinforcing member 25D is arranged slightly below a plane HP including the welded portion Wd. The welded portion Wd and the reinforcing member 25D may be slightly deviated in a direction of the center axis if being arranged in the vicinity of the common plane HP, and even with such arrangement, the reinforcing member 25D exhibits an effect of reinforcing the welded portion Wd. Also, the reinforcing members 25D and 25D-2 are not limited to a single unit, but may be appropriately arranged in plurality.

Figure 9:
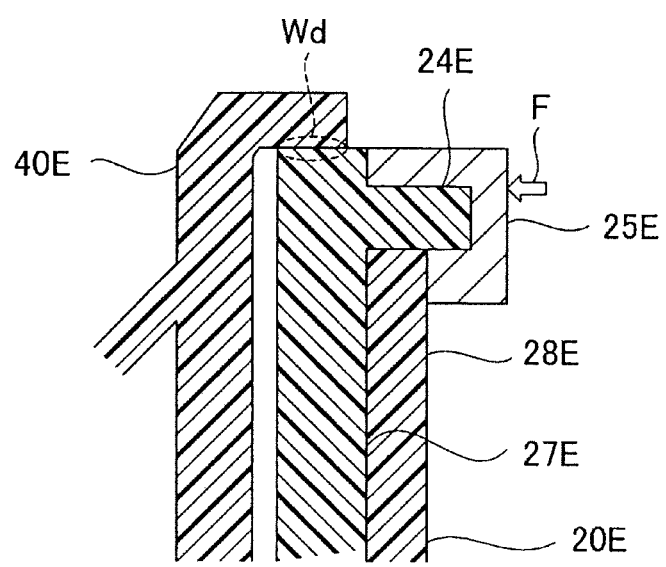
FIG. 9 is a sectional view showing main parts of a passage forming member and an injection port forming member according to a further variant.

(4) FIG. 9 is a sectional view showing main parts of a passage forming member 20E and an injection port forming member 40E according to a further variant. The present variant is characterized in a shape of a flange portion 24E. The passage forming member 20E has an inner resin layer 27E and an outer resin layer 28E. The flange portion 24E protrudes radially outwardly from an end of the inner resin layer 27. A reinforcing member 25E is formed in an annular shape having a U-shaped cross section to surround the flange portion 24E. In this way, the reinforcing member 25E can have various shapes, considering a mechanical strength effective to protect a welded portion Wd, a mounting ability to the flange portion 24E and the like.

Figure 10:
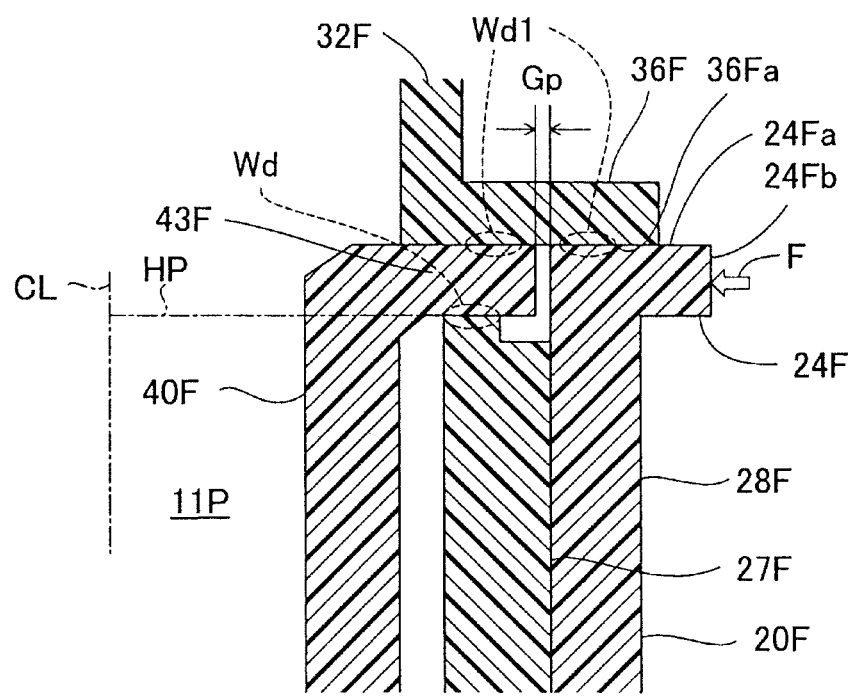
FIG. 10 is a sectional view showing main parts of a passage forming member and an injection port forming member according to a second embodiment.

C. Second Embodiment (1) FIG. 10 is a sectional view showing main parts of a passage forming member 20F and an injection port forming member 40F according to a second embodiment. The passage forming member 20F has an inner resin layer 27F and an outer resin layer 28F. On an upper part of the inner resin layer 27F, a flange portion 43F of the injection port forming member 40F is welded. A flange portion 24F is formed on an end of the outer resin layer 28F. An upper end of the outer resin layer 28F has an external force absorption portion 24Fb arranged in an annular shape along the entire perimeter of the passage forming member 20F. The external force absorption portion 24Fb is located more toward an outer perimeter than a region provided with a welded portion Wd, and is arranged to be spaced from an end surface of the flange portion 43F of the injection port forming member 40F between interposing a gap Gp therebetween. The external force absorption portion 24Fb is configured to be elastically deformed in a direction, in which the gap Gp is narrowed, when an external force F is exerted thereon. The gap Gp and the welded portion Wd are arranged on a common plane HP perpendicular to a center line CL of the fuel passage 11P. According to this configuration, if an external force F is exerted on the external force absorption portion 24Fb, the external force absorption portion 24Fb is elastically deformed in the direction, in which the gap Gp is narrowed, so that an impact force exerted on the welded portion Wd is mitigated. A cover member 32F has a flange portion 36F having a welding surface 36Fa. The flange portion 36F is welded at a welded portion Wdl to either the flange portion 24Fa or the flange portion 43F of the injection port forming member 40F, or both. In this way, even with such a configuration, in which the cover member 32F is welded to the injection port forming member 40F or the passage forming member 20F, the external force absorption portion 24Fb can also protect the welded portion Wdl in such a region.

Figure 11:
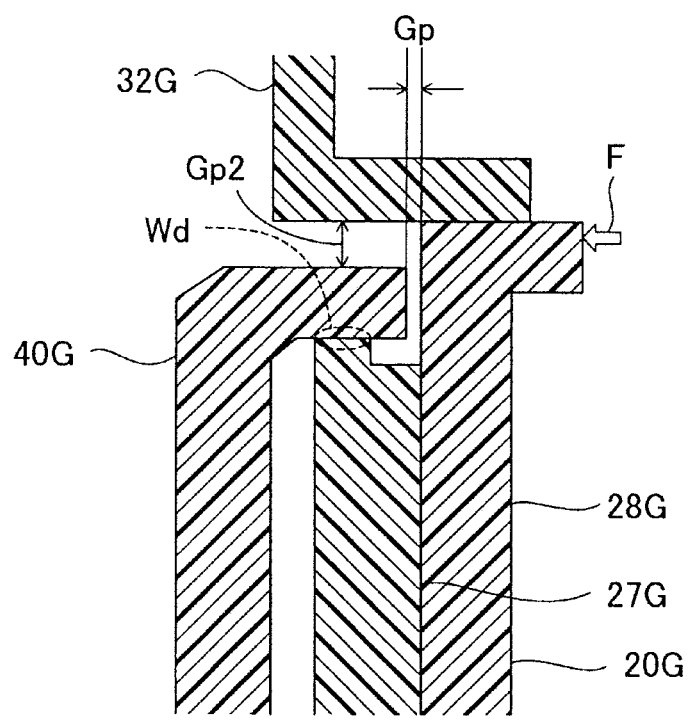
FIG. 11 is a sectional view showing main parts of a passage forming member and an injection port forming member according to a variant of the second embodiment of FIG. 10.

(2) FIG. 11 is a sectional view showing main parts of a passage forming member 20G and an injection port forming member 40F according to a variant of the second embodiment of FIG. 10. The present variant is characterized in a configuration in which an end of a cover member 32G is fixed to an outer resin layer 28G as compared to the second embodiment of FIG. 10. According to this configuration, a welded portion Wd is spaced from the cover member 32G with interposing a gap Gp2 therebetween, and thus there is a feature in which an impact exerted on the cover member 32G is hardly transferred to the welded portion Wd.

Figure 12:
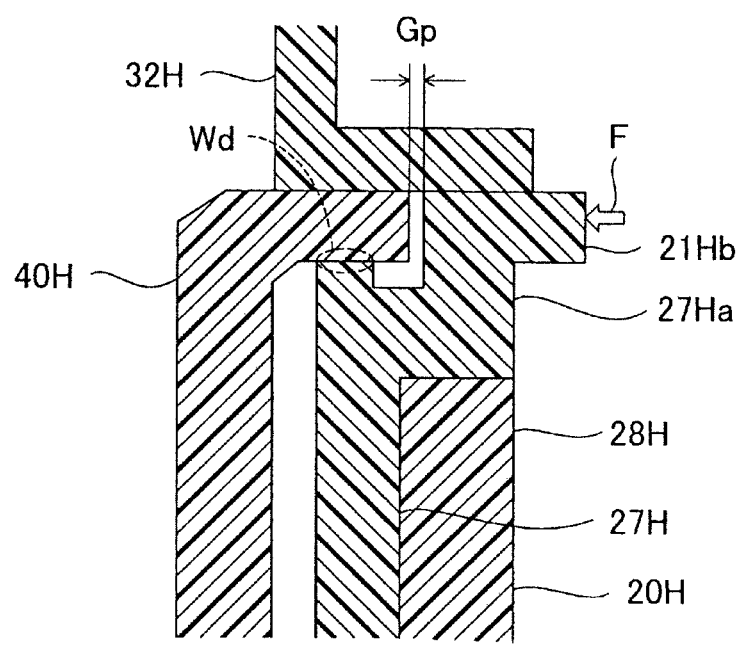
FIG. 12 is a sectional view showing a passage forming member and an injection port forming member according to another variant of the second embodiment.

(3) FIG. 12 is a sectional view showing a passage forming member 20H and an injection port forming member 40H according to another variant of the second embodiment. The present variant is characterized in a configuration in which an external force absorption portion 21Hb is provided on an inner resin layer 27H, as compared to the variant of FIG. 10. The passage forming member 20H has the inner resin layer 27H and an outer resin layer 28H. An L-shaped extension portion 27Ha is formed on an upper part of the inner resin layer 27H and an external force absorption portion 21Hb as a part of a flange portion 24H is also formed on an outer perimeter of the extension portion 27Ha. A gap Gp is formed between an end surface on an inner perimeter side of the flange portion 24H and an end of the injection port forming member 40H. If an external force E is exerted on the flange portion 24H, the extension portion 27Ha is bended to reduce the gap Gp, and thus an influence of the external force F on a welded portion Wd can be mitigated. Meanwhile, instead of the configuration in which the cover member 32H is welded to the injection port forming member 40H or the external force absorption portion 21Hb, the cover member 32H may be engaged with the passage forming member 20H, similarly to the first embodiment.

The present invention is not limited to the embodiments, examples, or variants as described above, but can be embodied in various configurations without departing from the spirit of the invention.

Although the reinforcing member is formed of a metallic material in the foregoing embodiment, the prevent invention is not limited to such a configuration, but it is sufficient if a material thereof has a mechanical strength higher than the passage forming member, and accordingly, for example, a material or the like, in which glass fillers are added to a resin material, may be used.

Although the passage forming member is constituted by stacking layers made of two types of resin materials, the invention is not limited to such a configuration, but the passage forming member may be formed in a single layer and the reinforcing member and the external force absorption portion may be provided on an end of the single layer.

Also, both of the external force absorption portion and the reinforcing member may be provided, instead of configurations, which either one thereof is provided.

In addition, although a configuration, in which each of the insertion passage forming member 30 and the injection port forming member 40 is formed in a single layer, is described in the first embodiment, the present invention is not limited to such a configuration, but a configuration, in which two or more types of resin materials are stacked on one another, may be employed or single layer and multi-layer configurations may be appropriately combined for each member.

Although the welded portion is formed by laser welding in the foregoing embodiments, the invention is not limited to such a configuration, but other means, such as heat plate welding, may be employed.

What is claimed is:

1. A fuel supply apparatus for supplying fuel to a fuel tank comprising:
    a passage forming member that has a fuel passage connected to the fuel tank;
    an injection port forming member that is disposed in the fuel passage and fixed to the passage forming member, the injection port forming member having an injection port forming a part of the fuel passage; and
    an injection port open and close mechanism that is openably and closably mounted to the injection port forming member and has an open and close member for opening and closing the injection port,
    wherein the passage forming member and the injection port forming member are formed of resin materials welded to each other and the passage forming member and the injection port forming member are welded at a welded portion along an entire perimeter thereof to seal a gap between the passage forming member and the injection port forming member,
    wherein the passage forming member has a reinforcing member arranged in an annular shape along the entire perimeter of the passage forming member,
    wherein the reinforcing member is formed of a material having a mechanical strength higher than the passage forming member, and
    wherein the reinforcing member and the welded portion are arranged in the vicinity of a common plane perpendicular to a center line of the fuel passage.

2. The fuel supply apparatus according to claim 1, wherein the reinforcing member is formed of a metallic material.

3. The fuel supply apparatus according to claim 2, wherein the passage forming member has a flange portion formed on an opened end of the passage forming member by enlarging a diameter of the end of the passage forming member toward an outer perimeter thereof, and the reinforcing member is mounted on the flange portion and arranged at a location spaced from the welded portion toward the outer perimeter.

4. The fuel supply apparatus according to claim 3, wherein the passage forming member has an inner resin layer having a pipe shape for forming the fuel passage and formed of a first resin material, and an outer resin layer stacked on an outer surface of the inner resin layer and formed of a second resin material;
    wherein the first resin material and the second resin material is configured so that one layer is formed of a resin material having a fuel permeation-resistance better than that of the other layer; and
    wherein the flange portion is formed on an end of either the inner resin layer or the outer resin layer.

5. The fuel supply apparatus according to claim 2, wherein the passage forming member has a supporting portion formed on an opened end of the passage forming member and protruding from an end of the passage forming member toward an inner perimeter thereof, and the reinforcing member is mounted to the supporting portion.

6. The fuel supply apparatus according to claim 4, further comprising a cover member mounted to an upper part of the passage forming member to cover the injection port open and close mechanism;
    wherein the cover member has a cup shape surrounded by a side wall portion and a top wall extending from a perimeter edge of the side wall portion, and has an engaging claw formed on the side wall portion; and
    wherein the engaging claw is engaged with the flange portion and thus the cover member is mounted to the passage forming member.

7. The fuel supply apparatus according to claim 1, wherein the reinforcing member is provided to be located more toward an inner perimeter than the welded portion and to be adjacent to the welded portion.

8. The fuel supply apparatus according to claim 1, wherein the passage forming member has a flange portion formed on an opened end of the passage forming member by enlarging a diameter of the end of the passage forming member toward an outer perimeter thereof, and the reinforcing member is mounted on the flange portion and arranged at a location spaced from the welded portion toward the outer perimeter.

9. The fuel supply apparatus according to claim 8, further comprising a cover member mounted to an upper part of the passage forming member to cover the injection port open and close mechanism;
    wherein the cover member has a cup shape surrounded by a side wall portion and a top wall extending from a perimeter edge of the side wall portion, and has an engaging claw formed on the side wall portion; and
    wherein the engaging claw is engaged with the flange portion and thus the cover member is mounted to the passage forming member.

10. The fuel supply apparatus according to claim 1, wherein the passage forming member has a supporting portion formed on an opened end of the passage forming member and protruding from an end of the passage forming member toward an inner perimeter thereof, and the reinforcing member is mounted to the supporting portion.

11. The fuel supply apparatus according to claim 10, further comprising a cover member mounted to an upper part of the passage forming member to cover the injection port open and close mechanism;
    wherein the cover member has a cup shape surrounded by a side wall portion and a top wall extending from a perimeter edge of the side wall portion, and has an engaging claw formed on the side wall portion; and
    wherein the engaging claw is engaged with the flange portion and thus the cover member is mounted to the passage forming member.

12. The fuel supply apparatus according to claim 1, further comprising a cover member mounted to an upper part of the passage forming member to cover the injection port open and close mechanism;
    wherein the cover member has a cup shape surrounded by a side wall portion and a top wall extending from a perimeter edge of the side wall portion, and has an engaging claw formed on the side wall portion; and wherein the engaging claw is engaged with the flange portion and thus the cover member is mounted to the passage forming member.

13. A fuel supply apparatus for supplying fuel to a fuel tank, comprising:
- a passage forming member that has a fuel passage connected to the fuel tank;
- an injection port forming member that is disposed in the fuel passage and fixed to the passage forming member, the injection port forming member having an injection port constituting a part of the fuel passage; and
- an injection port open and close mechanism that is openably and closably mounted to the injection port forming member and has an open and close member for opening and closing the injection port,
- wherein the passage forming member and the injection port forming member are formed of resin materials welded to each other and the passage forming member and the injection port forming member are welded at a welded portion along an entire circumference thereof to seal a gap between the passage forming member and the injection port forming member,
- wherein the passage forming member has an external force absorption portion arranged in an annular shape along the entire circumference of the passage forming member, and the external force absorption portion is located more toward an outer perimeter than a region provided with the welded portion and is arranged with a gap,
- wherein the external force absorption portion is configured to be elastically deformed in a direction, in which the gap is narrowed, when an external force F is exerted thereon, and
- wherein the gap and the welded portion are arranged on a common plane perpendicular to a center line of the fuel passage.

14. The fuel supply apparatus according to claim 13, wherein the passage forming member has a flange portion formed on an opened end of the passage forming member by enlarging a diameter of the end of the passage forming member toward an outer perimeter thereof, and the external force absorption portion is formed on the flange portion.

15. The fuel supply apparatus according to claim 14, wherein the passage forming member has an inner resin layer having a pipe shape for forming the fuel passage and formed of a first resin material, and an outer resin layer stacked on an outer surface of the inner resin layer and formed of a second resin material;
- wherein the first resin material and the second resin material is configured so that one layer is formed of a resin material having a fuel permeation-resistance better than that of the other layer; and
- wherein the flange portion is formed on an end of either the inner resin layer or the outer resin layer.

16. The fuel supply apparatus according to claim 15, further comprising a cover member mounted to an upper part of the passage forming member to cover the injection port open and close mechanism;
- wherein the cover member has a cup shape surrounded by a side wall portion and a top wall, and has an engaging claw formed on the side wall portion; and
- wherein the engaging claw is engaged with the flange portion and thus the cover member is mounted to the passage forming member.

17. The fuel supply apparatus according to claim 14, further comprising a cover member mounted to an upper part of the passage forming member to cover the injection port open and close mechanism;
- wherein the cover member has a cup shape surrounded by a side wall portion and a top wall, and has an engaging claw formed on the side wall portion; and
- wherein the engaging claw is engaged with the flange portion and thus the cover member is mounted to the passage forming member.

* * * * *